March 24, 1959 J. SARDELLA 2,879,106
WHEEL RIMS FOR TIRES OF TRUCKS AND THE LIKE
Filed July 15, 1957 2 Sheets-Sheet 1
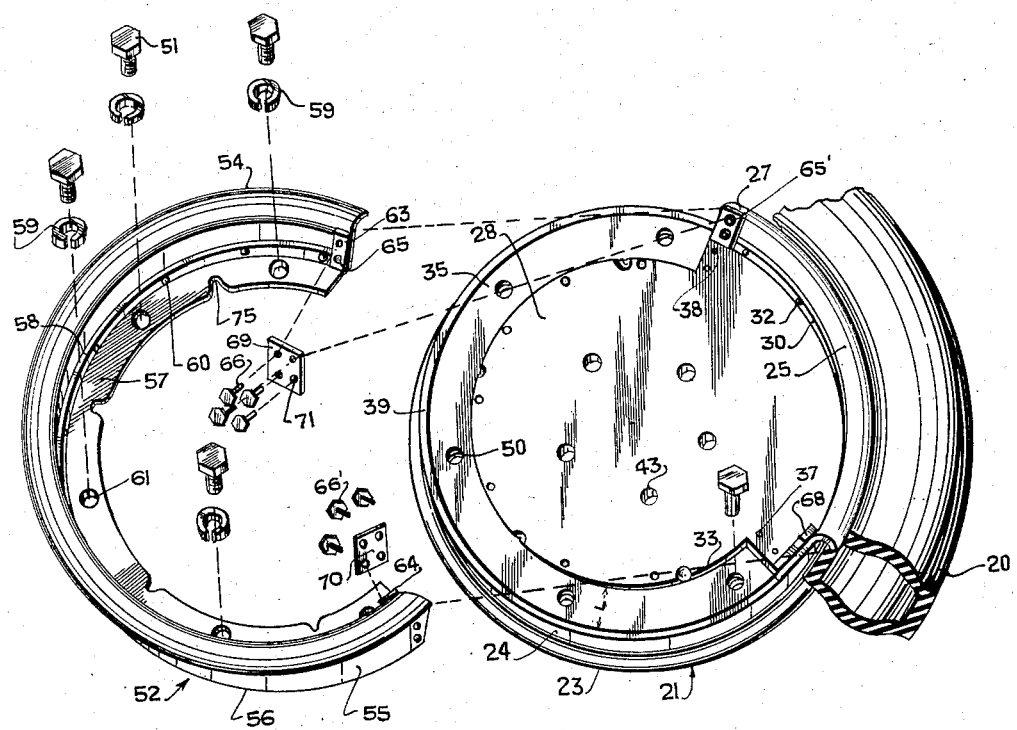
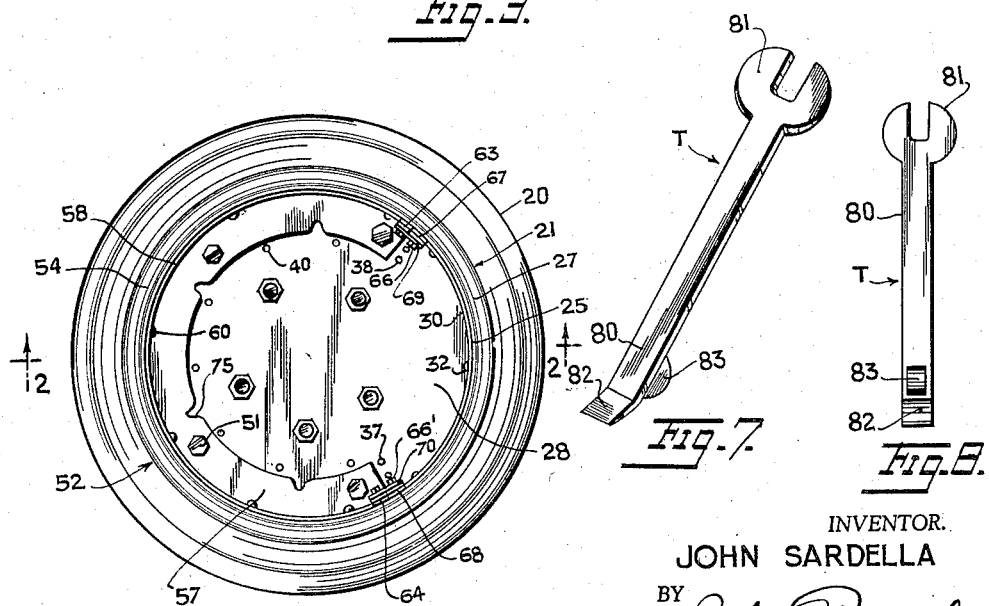
INVENTOR.
JOHN SARDELLA
BY
ATTORNEY March 24, 1959   J. SARDELLA   2,879,106
WHEEL RIMS FOR TIRES OF TRUCKS AND THE LIKE
Filed July 15, 1957
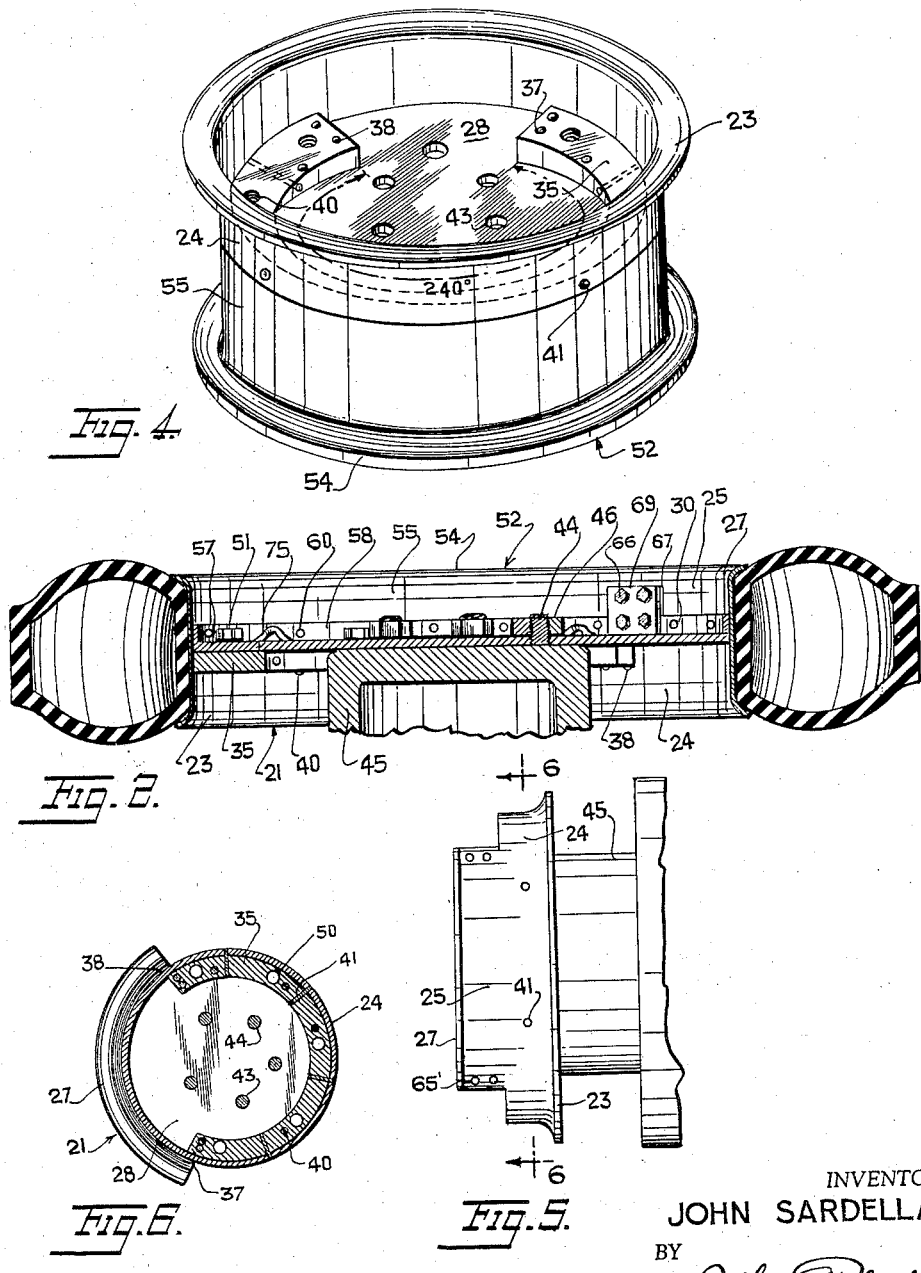
INVENTOR.
JOHN SARDELLA
BY
ATTORNEY

United States Patent Office 2,879,106
Patented Mar. 24, 1959

2,879,106

WHEEL RIMS FOR TIRES OF TRUCKS AND THE LIKE

John Sardella, Bronx, N.Y.

Application July 15, 1957, Serial No. 672,094

8 Claims. (Cl. 301—31)

This invention relates to the art of vehicle wheels and particularly concerns a wheel rim or wheel frame assembly for supporting a tire of a truck, bus or the like heavy vehicle.

The invention is directed at providing a multipart wheel rim or frame which is readily disassembled to facilitate removal of a tire while the main body of the frame remains attached to the vehicle.

Heretofore it has been necessary to remove the entire wheel from a vehicle such as a truck or bus in order to remove the tire. During the tire removal process the tire was severely strained and often struck with a hammer to release it from the conventional one-piece wheel rim or frame. The difficult and laborious tasks of removing a tire from a wheel rim of a truck and of mounting a tire on the rim have heretofore required special equipment, jigs, and tools. The need has long existed for a vehicle wheel rim or frame which would facilitate removal from and replacement on the wheel frame of a tire. Particularly needed was a wheel structure from which a tire could be readily removed and replaced with a simple tool such as a lug wrench.

It is, therefore, a principal object of the invention to provide a multipart wheel frame capable of being quickly disassembled to remove a tire mounted thereon.

It is a further object to provide a multipart wheel rim for supporting a tire, the rim including a removable arcuate section.

It is a further object to provide a multipart wheel rim having two interlocked sections, one of the sections being an arcuate-shaped plate, the other section being a circular ring adapted for rotation on a wheel support and having an outwardly extending portion arranged to interfit with the arculate section.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view of a wheel assembly embodying the invention.

Fig. 2 is an enlarged sectional view taken on lines 2—2 of Fig. 1.

Fig. 3 is an exploded perspective view of portions of a wheel frame according to the invention.

Fig. 4 is a perspective view of the rear or inner side of the wheel frame.

Fig. 5 is an end elevational view of the wheel frame mounted on a wheel support.

Fig. 6 is a sectional view taken on lines 6—6 of Fig. 5.

Fig. 7 is a perspective view of a tool useful in disassembling the wheel frame.

Fig. 8 is a rear plan view of the tool.

In Fig. 1 is shown a tire 20 for a truck, bus, or the like heavy vehicle mounted on a wheel frame 21 embodying the invention. The wheel frame, as best shown in Figs. 2 and 3, includes a generally circular annular body having a full circular flange 23 on its inner side. The frame has a cylindrical center ring section 24 which has an offset arcuate wall portion 25 extending peripherally about 120°. This arcuate portion has an arcuate flange 27. A flat, generally circular plate 28 is mounted within ring 24. The periphery of the plate is disposed midway between flanges 23 and 27. Welded to plate 28 is an arcuate strip or flange 30 which is located at the periphery of the plate and is secured to frame portion 25 by rivets 32. Plate 28 has an arcuate cut-out 33 extending about 240° or slightly less at the periphery of the plate. This cut-out extends from one end of the upstanding frame wall portion 25 to the other. The cut-out is covered and closed by a similarly shaped flat arcuate plate 35. Plate 35 is a circularly curved annulus extending slightly more than 240° so that its ends project just beyond the ends of the cut-out where rivets 37 and 38 secure the ends of plate 35 to plate 28. An arcuate ledge L is thus formed at the arcuate edge 39 of the wheel frame. The depth of the ledge L is the thickness of the plate 28, as clearly shown in Fig. 3. The bottom or base of the ledge is the upper or outer exposed surface of plate 35. Rivets 40 are spaced around the plate 35 and secure it to plate 28 which the plate 35 overlaps. Additional radially arranged rivets 41, best shown in Fig. 6, extend through the wall of ring 24 into the plate 35 to reinforce its mounting in the wheel frame.

Plate 28 is provided with a plurality of apertures 43 through which may be extended the studs 44 of a brake drum or cylindrical wheel support 45 shown in Figs. 2 and 5. Nuts 46 are threaded on the studs and hold the wheel frame to the wheel support. The wheel support 45 abuts the underside of plate 28 as shown in Fig. 2.

In plate 35 is a plurality of spaced holes 50. These holes are threaded and receive the threaded bolts 51. Bolts 51 with lock washers 59 are used to secure the arcuate-shaped flanged frame section 52 to the wheel frame. This member has an upper or outer turned flange 54 which fits against the ends of flange 27 to form a full circular flange which retains the tire 20 on the wheel frame. Frame section 52 has an annular wall 55 which extends circularly about 240° to fit against the ends of the frame wall portion 25. The lower edge 56 of wall 55 abuts the edge 39 of the wheel frame when the frame section 52 is mounted thereon. An arcuate flange, plate or strip 57 is welded to an upstanding arcuate strip 58. Strip 58 is secured to wall 55 by rivets 60. Plate 57 fits into the ledge L formed by cut-out 33 and rests on plate 35. The plate 57 has apertures 61 which register with apertures in plate 35 so that the shanks of bolts 51 pass through them to secure wheel frame section 52 to the wheel frame. Rectangular flat plates 63 and 64 are welded to the ends of wall 55. These plates have threaded holes 65 which receive the threaded shanks of bolts 66 and 66'. Similar apertured rectangular plates 67 and 68 are mounted on the ends of wall 25 and when section 52 is fitted to the wheel frame the outer sides of plates 63 and 64, respectively, are juxtaposed to the outer sides of plates 67 and 68.

Substantially square cleat plates 69 and 70 having apertures 71 are used to secure the rectangular bolt seat plates 63, 67 and 64, 68 together when bolts 66 and 66' are threaded therein.

Plate 57 has a plurality of spaced struck up projections or lips 75. These lips define recesses or mouths with the underlying plate 35 when the arcuate frame section 52 is located in wheel frame 21. The purpose of these recesses is to provide means whereby the frame section 52 can be pried up and released from wheel frame 21 when the tire 20 is mounted on the wheel frame. The bolts 51, 66 and 66' will, of course, be removed before the frame section can be pried up and removed from the wheel frame.

A suitable tool T for removing the bolts and prying out the wheel frame section 52 is shown in Figs. 7 and 8. This tool has an elongated shaft 80. At one end of the shaft is a wrench head 81 and at the other end is an offset or bent tip or blade 82. A projection 83 is integrally formed near tip 82 serves to increase the leverage and serves as a fulcrum for raising the plate 57 and wheel frame section 52.

In operation of the device, the frame section 52 will be removed so that tire 20 can easily be mounted upon the wheel frame 21. The frame section 52 can be manually pushed into place with plate resting in ledge L. Bolts 51 are then threaded into plate 35. Then plates 69 and 70 are placed over the butt joints of wall 55 to wall 25 and bolts 66 and 66' will be screwed into the plates 63, 64, 67, 68. The tire may be in an inflated or deflated condition when the frame section is mounted to the remainder of the wheel assembly.

If it is desired to remove the tire 20 from the wheel support 45 shown in Fig. 2 without disturbing the nuts 46 which hold the wheel on the wheel support 45, it is only necessary to remove the bolts 51 and 66, 66' to loosen the frame section 52. Then the frame section can be removed manually, with the aid of tool T if necessary. The removal of the frame section clears the way to removal of the tire since it is only held in the 120° arcuate frame portion 25. The tire may be in an inflated or deflated condition when removed from the wheel frame, to leave the wheel frame mounted on the wheel support as shown in Fig. 5.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A wheel assembly, comprising a circular annular frame, said frame having an outwardly extending flanged arcuate portion having an angular length less than 180°, an arcuate-shaped plate having an angular length greater than 180°, said plate having its outer ends abutting opposite ends of said portion, means bolting said plate and portion together at the abutting ends thereof, said plate having one longitudinal edge juxtaposed with a corresponding edge of the frame outside the ends of said portion, a flat generally circular plate secured to said frame between opposite longitudinal edges of said portion, said circular flat plate having a plurality of apertures to receive threaded studs of a wheel support, said circular flat plate further having an arcuate cut-out substantially coextensive with and located adjacent to said corresponding edge of the frame, and a flat plate secured to said circular flat plate, said flat plate overlapping and covering said cut-out to define an arcuate ledge with the circular flat plate, said arcuate-shaped plate having a flange seated on said ledge.

2. A wheel assembly, comprising a circular annular frame, said frame having an outwardly extending flanged arcuate portion, said portion having an angular extent of about 120°, an arcuate-shaped plate having an angular extent of about 240°, said plate having its opposite ends abutting and bolted with opposite ends of said portion, said plate having a longitudinal edge abutting a corresponding edge of the frame outside of said portion, and a generally circular plate secured between opposite sides of the frame at said portion, said circular plate having an arcuate cut-out substantially coextensive with said corresponding edge for seating a portion of said arcuate plate therein, said circular plate further having a plurality of spaced apertures for receiving threaded studs of a wheel support for said frame.

3. A wheel assembly, comprising a circular annular frame, said frame having an outwardly extending flanged arcuate portion, said portion having an angular extent of about 120°, an arcuate-shaped plate having an angular extent of about 240°, said plate having its opposite ends abutting and bolted with opposite ends of said portion, said plate having a longitudinal edge abutting a corresponding edge of the frame outside of said portion, and a flat generally circular plate secured between opposite sides of the frame at said portion, said flat plate having an arcuate cut-out substantially coextensive with said corresponding edge for receiving a portion of said arcuate-shaped plate therein, said flat plate having means for securing thereto a wheel support for said frame.

4. A wheel assembly, comprising a circular annular frame, said frame having an outwardly extending flanged arcuate portion having an angular length less than 180°, an arcuate first plate having an angular length greater than 180°, said plate having its outer ends abutting opposite ends of said portion, means bolting said plate and portion together at the abutting ends thereof, said plate having one longitudinal edge juxtaposed with a corresponding edge of the frame outside the ends of said portion, a generally circular plate secured to said frame between opposite longitudinal edges of said portion, said circular plate having means to secure thereto a wheel support, said circular plate further having an arcuate cut-out substantially coextensive with and located adjacent to said corresponding edge of the frame, and a flat second plate secured to said circular plate, said second plate overlapping and covering said cut-out to define an arcuate ledge with the circular plate, said first arcuate plate having a flange seated in said ledge.

5. A wheel assembly, comprising a circular annular frame having a cylindrical portion with an outwardly flared flanged edge, said frame having an arcuate portion extending beyond the opposite edge of the cylindrical portion, said arcuate portion having another outwardly flared flanged edge, said arcuate portion having an angular extent longitudinally of about 120°, a flat first plate secured to said frame at said arcuate portion, said flat plate having an arcuate cutout at the periphery thereof located beyond the ends of said arcuate portion, a pair of butt joint bolt seat plates overlying the ends of said arcuate portion, a flat arcuate second plate secured to one side of said first plate and overlying said cut-out to define therewith an arcuate ledge, said first plate having a plurality of apertures located to receive threaded studs of a wheel support for said frame, a plurality of radial rivets securing said second plate to said cylindrical portion of the frame, a plurality of other rivets securing the second plate to the first plate, said flat first plate being located adjacent to said opposite edge of said cylindrical portion and being substantially coextensive therewith, said flat first plate having a plurality of spaced threaded apertures for receiving respectively threaded bolts, an arcuate-shaped third plate having an inwardly extending arcuate flange, said flange having a plurality of apertures spaced to register with the apertures in said second plate, said third plate being removably mounted in said frame with said arcuate flange seated in said ledge, said third plate having opposite ends abutting opposite ends of said arcuate portion, another pair of butt joint bolts seat plates overlying the opposite ends of said third plate, a pair of cleat plates respectively overlying the bolt seat plates on the third plate and said arcuate portion, a plurality of bolts removably securing the cleat plates on the bolt seat plates, said arcuate flange having a plurality of spaced portions formed to define means for receiving a tool to raise the arcuate flange and release the third plate from the frame, and a tire removably mounted on said frame and third plate, said tire being releasable from the frame upon removal of the third plate from the frame.

6. A wheel assembly, comprising a circular annular frame having a cylindrical portion with an outwardly flared flanged edge, said frame having an arcuate portion extending beyond the opposite edge of the cylindrical portion, said arcuate portion having another outwardly flared flanged edge, said arcuate portion having an angular extent longitudinally of about 120°, a first flat plate secured to said frame at said arcuate portion, said flat plate having an arcuate cutout at the periphery thereof located beyond the ends of said arcuate portion, a flat second plate secured to one side of said first plate and overlying said cut-out to define therewith an arcuate ledge, said first plate having a plurality of apertures located to receive threaded studs of a wheel support for said frame, a plurality of radial rivets securing said flat second plate to said cylindrical portion of the frame, a plurality of other rivets securing the flat second plate to the first plate, said first flat plate being located adjacent to said opposite edge of said cylindrical portion and being substantiallly coextensive therewith, said second flat plate having a plurality of spaced threaded apertures for receiving respectively threaded bolts, an arcuate-shaped plate having an inwardly extending arcuate flange, said flange having a plurality of apertures spaced to register with the apertures in said second flat plate, said arcuate-shaped plate being removably mounted in said frame with said arcuate flange seated in said ledge, said arcuate-shaped plate having opposite ends abutting opposite ends of said arcuate portion, said arcuate flange having a plurality of spaced portions formed to define means for receiving a tool to raise the arcuate flange and release the arcuate-shaped plate from the frame, and a tire removably mounted on said frame and arcuate-shaped plate, said tire being releasable from the frame upon removal of the arcuate-shaped plate from the frame.

7. A wheel assembly, comprising a circular annular frame having a cylindrical portion with an outwardly flared flanged edge, said frame having an arcuate portion extending beyond the opposite edge of the cylindrical portion, said arcuate portion having another outwardly flared flanged edge, said arcuate portion having an angular extent longitudinally of about 120°, a first flat plate secured to said frame at said arcuate portion, said flat plate having an arcuate cutout at the periphery thereof located beyond the ends of said arcuate portion, a second flat plate secured to one side of said first plate and overlying said cut-out to define therewith an arcuate ledge, said first plate being adapted to secure said frame to a wheel support, a plurality of rivets securing said flat arcuate plate to said cylindrical portion of the frame, a plurality of other rivets securing the second flat plate to the first plate, said first flat plate being located adjacent to said opposite edge of said cylindrical portion and being substantially coextensive therewith, said second flat plate having a plurality of spaced threaded apertures for receiving respectively threaded bolts, an arcuate-shaped plate having an inwardly extending arcuate flange, said flange having a plurality of apertures spaced to register with the apertures in said second flat plate, said arcuate-shaped plate being removably mounted in said frame with said arcuate flange seated in said ledge, said arcuate-shaped plate having opposite ends abutting opposite ends of said arcuate portion, said arcuate flange having a plurality of spaced raised lips formed to define means for receiving a tool to raise the arcuate flange and release the arcuate-shaped plate from the frame.

8. A wheel assembly, comprising a circular annular frame having a cylindrical portion with an outwardly flared flanged edge, said frame having an arcuate portion extending beyond the opposite edge of the cylindrical portion, said arcuate portion having another outwardly flared flanged edge, said arcuate portion having an angular extent longitudinally of about 120°, a flat first plate secured to said frame at said arcuate portion, said flat plate having an arcuate cut-out at the periphery thereof located beyond the ends of said arcuate portion, a pair of butt joint seat plates overlying the ends of said arcuate portion, a flat second plate secured to one side of said first plate and overlying said cut-out to define therewith an arcuate ledge, said first plate having a plurality of apertures located to receive threaded studs of a wheel support for said frame, a plurality of radial rivets securing said second plate to said cylindrical portion of the frame, and a plurality of other rivets securing the second plate to the first plate, said second plate being located adjacent to said opposite edge of said cylindrical portion, said second plate having a plurality of spaced threaded apertures for receiving respectively threaded bolts to removably secure an arcuate flanged member thereto.

References Cited in the file of this patent
UNITED STATES PATENTS

| | | |
|---|---|---|
| 1,429,901 | Clark | Sept. 19, 1922 |
| 1,698,022 | Macgillivray | Jan. 8, 1929 |
| 2,308,959 | Brink | Jan. 19, 1943 |